US008791918B2

(12) United States Patent
Sudo (10) Patent No.: US 8,791,918 B2
(45) Date of Patent: Jul. 29, 2014

(54) CHARACTER INPUT DEVICE, CHARACTER-INPUT CONTROL METHOD, STORING CHARACTER INPUT PROGRAM (75) Inventor: Tomohiro Sudo, Yokohama (JP)

(73) Assignee: Kyocera Corporation, Kyoto (JP)

( * ) Notice: Subject to any disclaimer, the term of this patent is extended or adjusted under 35 U.S.C. 154(b) by 65 days.

(21) Appl. No.: 13/440,150

(22) Filed: Apr. 5, 2012

(65) Prior Publication Data
US 2012/0256858 A1 Oct. 11, 2012

(30) Foreign Application Priority Data

Apr. 7, 2011 (JP) ................... 2011-085811

(51) Int. Cl.
*G06F 3/041* (2006.01)
*G06F 3/0488* (2013.01)
*G06F 3/01* (2006.01)
*G06F 3/023* (2006.01)

(52) U.S. Cl.
CPC ............ *G06F 3/016* (2013.01); *G06F 3/04886* (2013.01); *G06F 3/0233* (2013.01); *G06F 3/018* (2013.01)
USPC ........... 345/173; 345/174; 345/156; 345/169; 345/181; 715/784; 715/786; 178/18.01; 178/18.09

(58) Field of Classification Search
USPC .......... 345/173, 156, 169, 181; 715/784, 786; 178/18.01–18.09
See application file for complete search history.

(56) References Cited

U.S. PATENT DOCUMENTS

2008/0174570 A1* 7/2008 Jobs et al. ................. 345/173
2010/0235793 A1* 9/2010 Ording et al. ............. 715/863
2010/0238116 A1* 9/2010 Shin .......................... 345/168

FOREIGN PATENT DOCUMENTS

JP 2008108233 5/2008

* cited by examiner

*Primary Examiner* — Shaheda Abdin (74) *Attorney, Agent, or Firm* — Lowe Hauptman & Ham, LLP (57) ABSTRACT According to an aspect, a character input device includes a touch panel, a vibrating unit, and a control unit. The touch panel displays a plurality of buttons each of which corresponds to a character, and detects a contact operation. The vibrating unit vibrates the touch panel. When the contact operation by a contact is detected by the touch panel while the contact on the touch panel is continued since a start of the contact at a first position on the touch panel on which the plurality of buttons are displayed, the control unit receives a character corresponding to a button, as an input, displayed at the position where the contact operation is detected. The control unit causes the vibrating unit to change a vibration behavior of the touch panel when the contact operation is detected.

9 Claims, 10 Drawing Sheets

| Character | Q | W | E | ... |
|---|---|---|---|---|
| x | 10 | 32 | 54 | ... |
| y | 10 | 10 | 10 | ... |
| Width | 20 | 20 | 20 | ... |
| Height | 40 | 40 | 40 | ... |

CHARACTER INPUT DEVICE, CHARACTER-INPUT CONTROL METHOD, STORING CHARACTER INPUT PROGRAM

CROSS-REFERENCE TO RELATED APPLICATIONS

This application claims priority from Japanese Application No. 2011-085811, filed on Apr. 7, 2011, the content of which is incorporated by reference herein in its entirety.

BACKGROUND

1. Technical Field

The present disclosure relates to a character input device, a character-input control method, and a storage medium storing therein a character input program.

2. Description of the Related Art

Recently, touch panels are widely used to achieve a compact character input device that allows intuitive operation and does not include a device such as a keyboard requiring a physically large area. As a technology for inputting a character using a touch panel, a technology for inputting a character using a virtual keyboard displayed on the touch panel (hereinafter, "virtual keyboard") is disclosed in, for example, Japanese Patent Application Laid-Open No. 2008-108233.

The above-discussed technology for inputting a character using the virtual keyboard fails to provide a user with an actual feeling of pressing a keyboard unlike the case where he/she inputs a character using a physical keyboard. Therefore, it is difficult for the user to recognize which character is input.

For the foregoing reasons, there is a need for a character input device, a character-input control method, and a character input program that allows the user to recognize which character is input through an operation on the touch panel.

SUMMARY

According to an aspect, a character input device includes a touch panel, a vibrating unit, and a control unit. The touch panel displays a plurality of buttons each of which corresponds to a character, and detects a contact operation. The vibrating unit vibrates the touch panel. When the contact operation by a contact is detected by the touch panel while the contact on the touch panel is continued since a start of the contact at a first position on the touch panel on which the plurality of buttons are displayed, the control unit receives a character corresponding to a button, as an input, displayed at the position where the contact operation is detected. The control unit causes the vibrating unit to change a vibration behavior of the touch panel when the contact operation is detected.

According to another aspect, a character-input control method is executed by a character input device that includes a touch panel and a vibrating unit for vibrating the touch panel. The character-input control method includes: displaying a plurality of buttons each of which corresponds to a character on the touch panel; detecting a start of a contact at a first position on the touch panel on which the plurality of buttons are displayed; receiving a character corresponding to a button, as an input, displayed at a position where a contact operation is detected when the contact operation is detected while the contact is continued since the start of the contact at the first position; and causing the vibrating unit to change a vibration behavior of the touch panel when the contact operation is detected.

According to another aspect, a non-transitory storage medium stores therein a character input program. When executed by a character input device that includes a touch panel and a vibrating unit for vibrating the touch panel, the character input program causes the character input device to execute: displaying a plurality of buttons each of which corresponds to a character on the touch panel; detecting a start of a contact at a first position on the touch panel on which the plurality of buttons are displayed; receiving a character corresponding to a button, as an input, displayed at a position where a contact operation is detected when the contact operation is detected while the contact is continued since the start of the contact at the first position; and causing the vibrating unit to change a vibration behavior of the touch panel when the contact operation is detected.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the character input device; however, the present invention is not limited to mobile phones. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
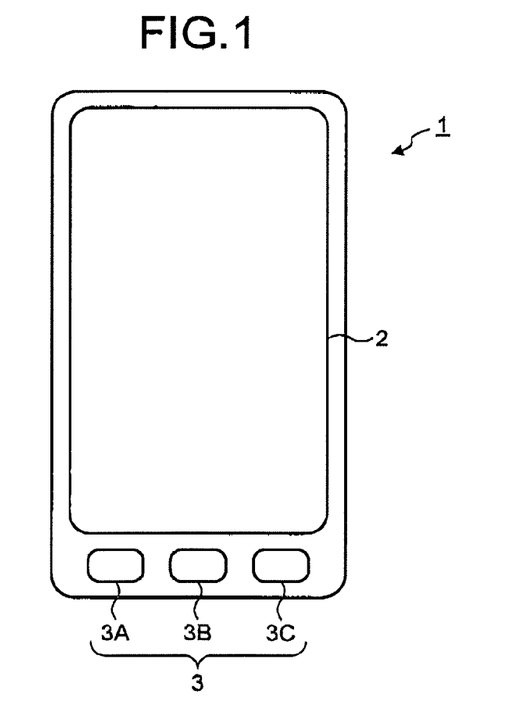
FIG. 1 is a front view of a mobile phone.

FIG. 1 is a front view of a mobile phone 1 which is an embodiment of a character input device. The mobile phone 1 includes a touch panel 2 and an input unit 3 formed from a button 3A, a button 3B, and a button 3C. The touch panel 2 displays characters, graphics, images, and so on, and detects various operations performed to the touch panel 2 using finger(s), a stylus, a pen, or the like (in the description herein below, for the sake of simplicity, it is assumed that the user touches the touch panel 2 with his/her finger(s)). When any one of the buttons is pressed, the input unit 3 activates a function corresponding to the pressed button.

Figure 2:
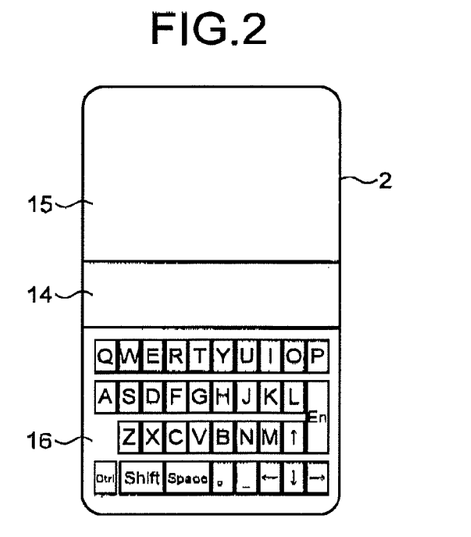
FIG. 2 is a diagram of a virtual keyboard displayed on a touch panel.

When receiving an input of a character from a user, the mobile phone 1 sets an input character-string candidate display area 14 and a text display area 15, and displays a virtual keyboard 16, as illustrated in FIG. 2. The input character-string candidate display area 14 is an area where a word and the like including a character input using the virtual keyboard 16 are displayed as a candidate for a character string that the user is about to input. The text display area 15 is an area where text consisting of input characters is displayed.

The virtual keyboard 16 includes a plurality of virtual buttons which look just like keys of a physical keyboard. For example, when the user puts his/her finger on a button "Q" in the virtual keyboard (touches the button with the finger), the operation is detected by the touch panel 2, and the mobile phone 1 receives a character "Q" as an input. Buttons corresponding to the alphabet are arranged on the virtual keyboard 16 in a QWERTY layout as illustrated in FIG. 2; however, the buttons may be arbitrarily arranged. Moreover, buttons corresponding to numbers of 0 to 9 may be displayed on the virtual keyboard 16 in a numeric keypad layout.

The mobile phone 1 further receives inputs of characters on the virtual keyboard 16 by a consecutive method. The consecutive method is an input method in which the user moves the finger over the virtual keyboard 16 while keeping the finger in contact with the touch panel 2 to allow continuous inputs of a plurality of characters. By the consecutive method, for example, moving the finger in the order of a button "W", a button "E", and a button "T" in a sliding manner while keeping the finger in contact with the touch panel 2 causes an input of a character string of "WET".

Thus, by the consecutive method, the user can input characters only by moving the finger as if it is sliding over the touch panel 2 without performing upward and downward operations of the finger in each button, which enables a significantly high-speed character input.

However, by the consecutive method, it is necessary to determine whether the user intentionally comes in contact with each of the buttons on a trace of a movement of the finger in order to input a character corresponding to the button or the user causes the finger to merely pass through the button in order to move the finger onto another button. For example, it is assumed that the layout of the virtual keyboard 16 is the QWERTY layout and the user wishes to input the word "WET". In this case, when the user's finger moves from the button "E" to the button "T", the finger passes through a button "R" between these buttons. Because of this, if it cannot be determined that the finger does not intentionally come in contact with the button "R", despite user's intentions, a character string of "WERT" is received as an input.

Therefore, the mobile phone 1 determines that each of buttons, among the buttons on the trace of a movement of the finger, displayed at a position where a specific operation (predetermined contact operation) is detected by the touch panel 2 is intentionally contacted by the user in order to input a character. Specifically, when an operation of starting the contact of the finger is detected by the touch panel 2 and there is a button at the position where the start of the contact is detected, the mobile phone 1 determines that the button is intentionally contacted. Moreover, when an operation of leaving the finger from the touch panel 2 is detected by the touch panel 2 after the movement of the finger and there is a button at a position where the end of the contact is detected, the mobile phone 1 determines that the button is intentionally contacted.

When the operation of changing the moving direction with the finger kept in contact with the touch panel 2 is detected by the touch panel 2 and there is a button at the position where the change in the moving direction is detected, the mobile phone 1 determines that the button is intentionally contacted. Specifically, the mobile phone 1 monitors the moving direction of the finger, and determines that, if the moving direction changes at a predetermined angle or more within a predetermined time and a position where the moving direction changes is within a button, the user intentionally comes in contact with the button.

Figure 3:
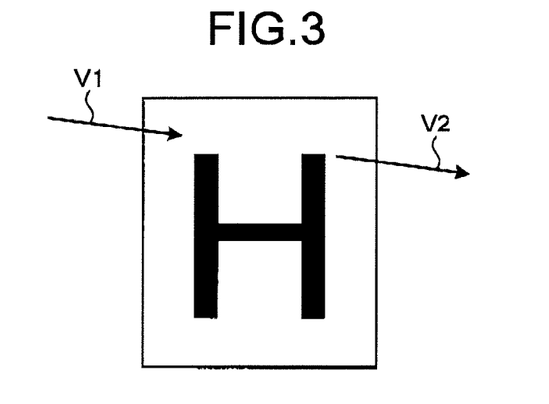
FIG. 3 is a diagram of an example in which a finger passes through a button area.
Figure 4:
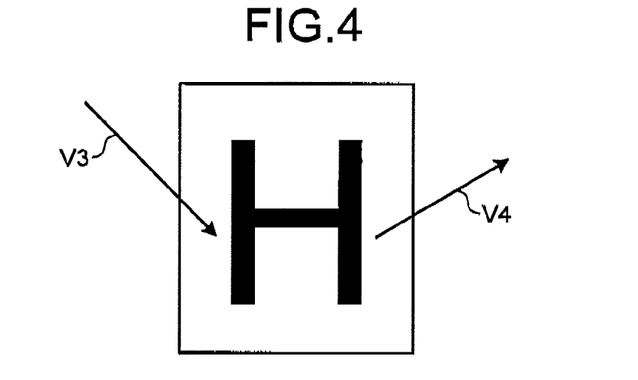
FIG. 4 is a diagram of an example in which a moving direction of the finger changes within the button area.

This is because, during moving to another button, when the finger is just passing through the button, it is considered that the finger moves over the buttons in a substantially constant direction and a difference in angles between V1 indicating a moving direction (vector) upon entering and V2 indicating a moving direction upon outgoing becomes small as illustrated in FIG. 3. On the contrary, as illustrated in FIG. 4, when the direction in which the finger is moving largely changes within a button and a difference in angles between V3 indicating a moving direction upon entering and V4 indicating a moving direction upon outgoing is large, there is a high possibility of changing the moving direction in order that the user intentionally comes in contact with the button and then comes in contact with another button. That is, it can be determined that the button is one of target buttons.

Figure 5:
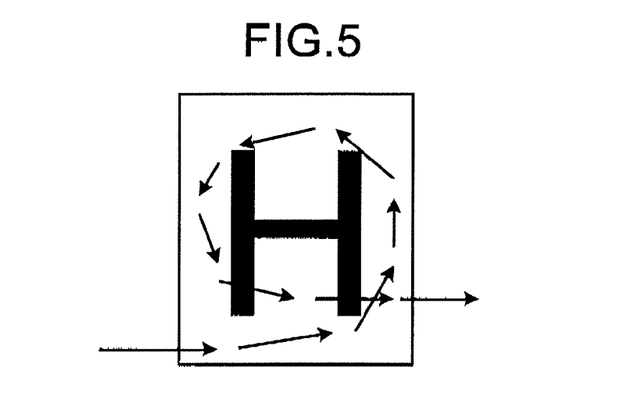
FIG. 5 is a diagram of an example in which the finger is drawing a turning trace within the button area.

When an operation of moving the finger while drawing a turning trace within a button area with the finger kept in contact with the touch panel 2 is detected by the touch panel 2 as illustrated in FIG. 5, the mobile phone 1 determines that the user intentionally comes in contact with the button. This is because it is considered that if the finger is just passing through the button, there is no possibility that the finger moves while drawing such a trace. When a trace having a characteristic shape such as a mountain-like shape and a wave-like shape is drawn by the finger instead of the turning trace, it may be determined that the user intentionally comes in contact with the button.

When a movement of the finger drawing a trace having a characteristic shape within the button area in the above manner is detected, it is determined that the button is intentionally contacted, and this enables the user to easily and continuously input the same character. For example, if the user wishes to continuously input a character "W" three times, the user has only to move the finger so as to draw a circle three times within the button area of "W". For example, by counting one turn each time the total of angles of a finger movement vector within the button area exceeds 360 degrees, the number of turns can be counted.

When the finger stays within the button area for a time period of a predetermined value or more while keeping in contact with the touch panel 2, the mobile phone 1 determines that the user intentionally comes in contact with the button. The time period of a predetermined value or more mentioned here is a time sufficiently longer than the time required when the finger merely passes through the button area, and may be a time period of, for example, about 0.5 second.

Figure 6:
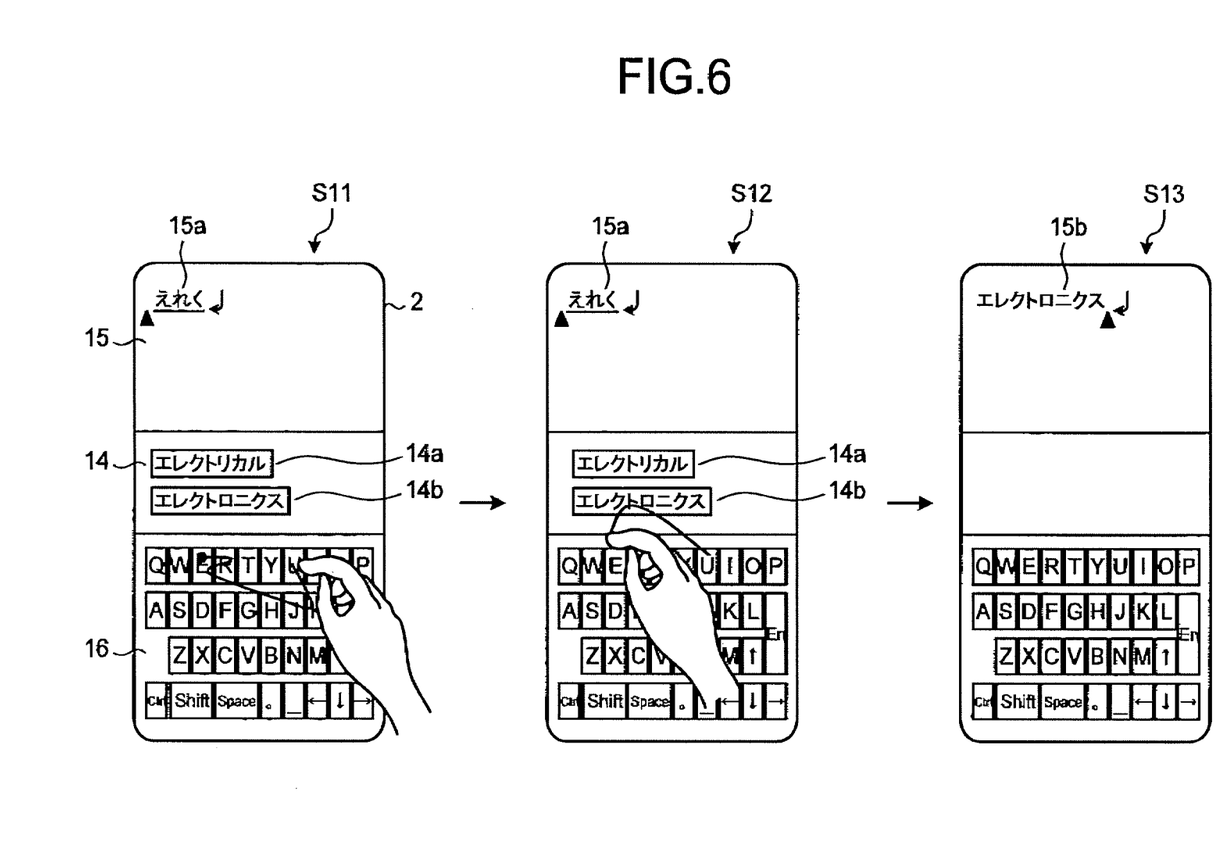
FIG. 6 is a diagram of an operation example when a candidate is selected.

The technology for specifying the position intended by the user using detection of a specific operation in this manner is also used when a candidate is selected, as illustrated in FIG. 6. The following example is an example when Japanese is input in Romaji input mode.

FIG. 6 is a diagram of an operation example when a candidate is selected. At Step S11, the finger is placed within a button area of "E", and then sequentially passes button areas of "R", "E", "H", "J", and "K" while keeping in contact with the touch panel 2, and stays within a button area of "U" for the time period of the predetermined value or more. In this case, the mobile phone 1 determines that the button "E" on which the finger is placed, the buttons "R", "E", and "K" in which the moving direction of the finger changes within each of the areas at a predetermined angle or more, and the button "U" where the finger stays for a predetermined time or more are intentionally contacted.

The mobile phone 1 performs Romaji-Kana conversion on "EREKU" written in Romaji obtained by connecting the characters corresponding to these buttons to obtain a Hiragana character string 15a, and displays the obtained Hiragana character string 15a in the text display area 15. The display is performed in order to inform the user which buttons are determined to be intentionally contacted, and a line is drawn under the Hiragana character string 15a, which indicates that this character string is undefined. In the text display area 15, at this time, a cursor (which is displayed as a black triangle in FIG. 6) indicating a position to which a new character is added appears just before the Hiragana character string 15a. In addition, a line break symbol indicating the position of a line break appears just after the Hiragana character string 15a.

The mobile phone 1 displays two character strings in the input character-string candidate display area 14: a candidate 14a ("EREKUTORIKARU" written in Katakana that means "electrical" in English) and a candidate 14b ("EREKUTORONIKUSU" written in Katakana that means "electronics" in English), which are obtained as candidates for the input character string by predictively converting the Hiragana character string 15a. The predictive conversion is a technology for predicting a character string, which the user is going to input, from characters which have been input, based on strength of a combination of the character string with the input characters, use frequency, and so on.

At Step S12, the finger enters the display area of the candidate 14b in the input character-string candidate display area 14 while keeping in contact with the touch panel 2, and, thereafter, changes the direction in which the finger is moving, and moves to the outside of the display area. In this case, because the direction in which the finger is moving changes at a predetermined angle or more in the display area of the candidate 14b, the mobile phone 1 determines that the candidate 14b is selected.

At Step S13, the mobile phone 1 deletes the Hiragana character string 15a which is the undefined character string, and displays the selected candidate 14b just after the cursor as a character string 15b. To indicate that a newly input character is added to a position after the character string 15b, the mobile phone 1 moves the cursor to a position just after the character string 15b.

In this manner, it is determined, based on the position where a specific operation is detected, which of the candidates for the input character string displayed in the input character-string candidate display area 14 is selected, and therefore the user can smoothly select the input character string with the finger kept in contact with the touch panel 2.

The mobile phone 1 informs the user that a predetermined contact operation is detected, each time the predetermined contact operation is detected during input of characters by the consecutive method, by changing a vibration behavior of the touch panel 2. By performing such a feedback, the user can perform operations while checking which character is input. Examples of changing the vibration behavior include a change in the strength of the vibration. The change in the strength of the vibration may include a change in the frequency of the vibration, a change in the amplitude of the vibration, and a change in both the frequency and the amplitude of the vibration. In addition, the change in the vibration behavior includes a change from a non-vibrating state to a vibrating state and a change from a vibrating state to a non-vibrating state.

When the strength of the vibration of the touch panel 2 is changed, an operational feeling of the buttons may be given to the user. There is a known phenomenon that a friction between the finger and the touch panel 2 is reduced when the strength of the vibration of the touch panel 2 is increased and the friction between the finger and the touch panel 2 is increased when the strength of the vibration of the touch panel 2 is decreased. By using the phenomenon, an operational feeling as if the user presses a physical button can be given to the user. In this case, to allow the strength of the vibration of the touch panel 2 to be decreased, the touch panel 2 may be continuously vibrated at a strength of a given value or more during input of characters by the consecutive method.

Figure 7:
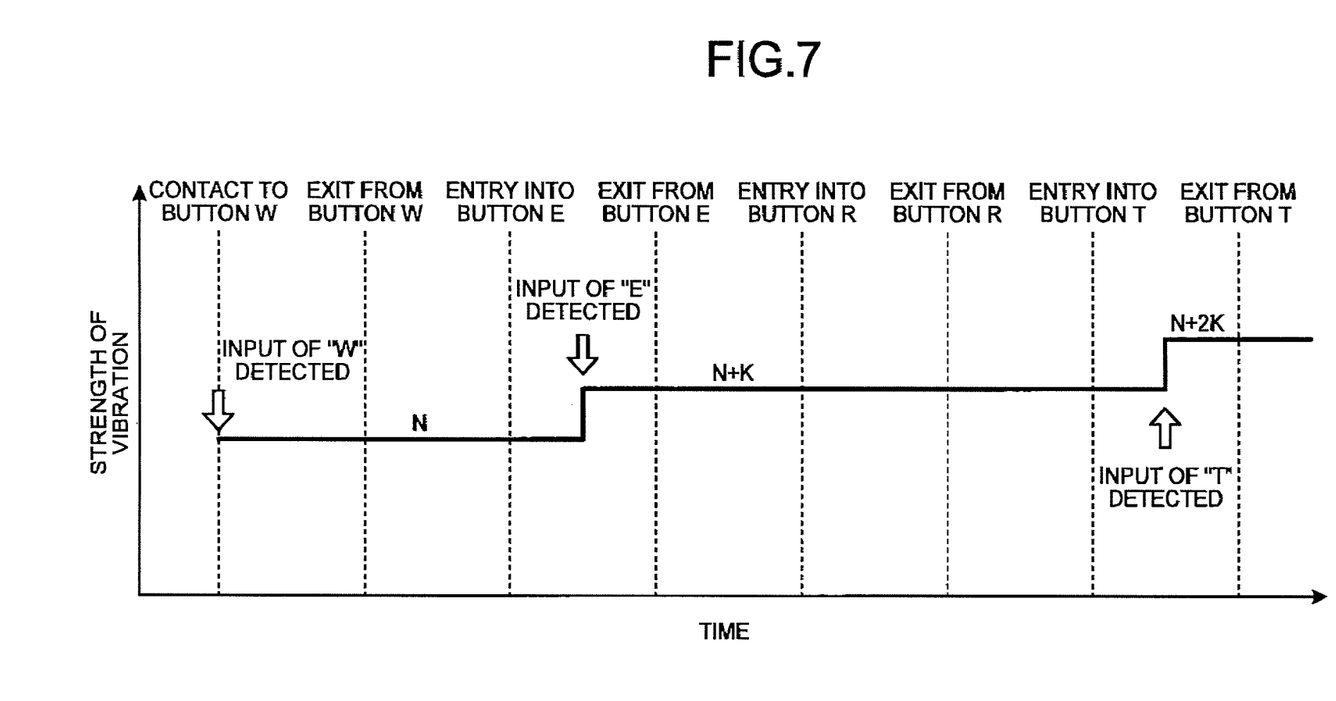
FIG. 7 is a diagram of an example of controlling vibration of the touch panel when characters are input in a consecutive method.

FIG. 7 is a diagram of an example of controlling the vibration of the touch panel when characters are input by the consecutive method. The example of FIG. 7 represents an example of the control in a case where three characters "W", "E", and "T" are input by the consecutive method. First, when the user comes in contact with a button area of "W" with the finger, the mobile phone 1 detects a predetermined contact operation to receive an input of "W", and starts vibrating the touch panel 2 at a strength N.

Subsequently, when the user moves the finger while keeping the finger in contact with the touch panel 2 and changes the moving direction within the button area of "E" at a predetermined angle or more, the mobile phone 1 detects the predetermined contact operation to receive an input of "E", and changes the strength of the vibration of the touch panel 2 to N+K. When the user further moves the finger and causes it to merely pass through the button area of "R", the predetermined contact operation is not detected and the strength of the vibration of the touch panel 2 remains as it is. When the user further moves the finger and changes the moving direction within the button area of "T" at a predetermined angle or more, the mobile phone 1 detects the predetermined contact operation to receive an input of "T", and changes the strength of the vibration of the touch panel 2 to N+2K.

In this way, when the predetermined contact operation is detected while the user keeps the finger in contact with the touch panel 2, the strength of the vibration of the touch panel 2 is changed, and the strength of the vibration of the touch panel 2 is kept constant until a next predetermined contact operation is detected. Thereby, the user can recognize that the character input is received while performing the character input by the consecutive method. Moreover, the control provided in this manner enables reduction of power consumption associated with the vibration. That is, by keeping the strength of the vibration of the touch panel 2 constant until the next predetermined contact operation is detected, it is not necessary to frequently change the strength of the vibration, which leads to reduction of power consumption. As illustrated in FIG. 7, the strength of the vibration of the touch panel 2 is changed K by K each time the predetermined contact operation is detected; however, K may be a positive value or a negative value. In other words, the strength of the vibration of the touch panel 2 may be increased or may be decreased each time the predetermined contact operation is detected.

If the user moves the finger at a high speed, because of a delay of the control, the finger may exit the button area where the predetermined contact operation is detected before the strength of the vibration of the touch panel 2 is changed. Therefore, when the user moves the finger at a speed of a predetermined threshold or more, the mobile phone 1 switches the timing of changing the strength of the vibration.

Figure 8:
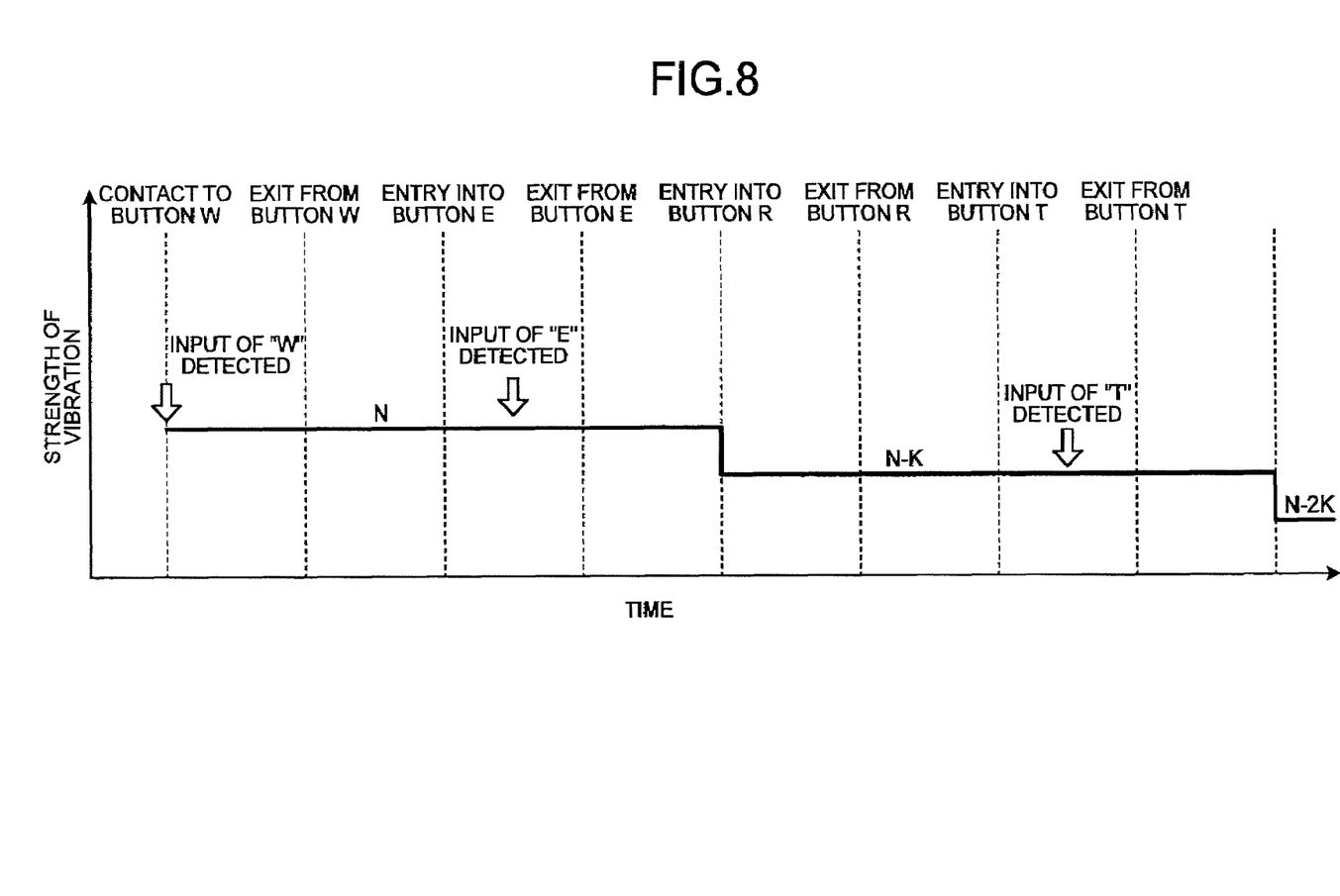
FIG. 8 is a diagram of an example of controlling vibration of the touch panel when the finger is moving at a high speed.

FIG. 8 is a diagram of an example of controlling the vibration of the touch panel 2 when the finger is moving at a high speed. The example of FIG. 8 represents an example of the control in the case where the three characters of "W", "E", and "T" are input by the consecutive method, similarly to the example of FIG. 7. First, when the user comes in contact with the button area of "W" with the finger, the mobile phone 1 detects the predetermined contact operation to receive an input of "W", and starts vibrating the touch panel 2 at the strength N.

Subsequently, when the user moves the finger while keeping the finger in contact with the touch panel 2 and changes the moving direction within the button area of "E" at a predetermined angle or more, the mobile phone 1 detects the predetermined contact operation to receive an input of "E". At this time, when the moving speed of the finger at the time of detecting the predetermined contact operation is the threshold or more, the mobile phone 1 changes the strength of the vibration of the touch panel 2 to N−K at a timing at which the finger enters a next button area of "R" after exiting the button area of "E". When the user further moves the finger and causes it to merely pass through the button area of "R", the predetermined contact operation is not detected and the strength of the vibration of the touch panel 2 remains as it is.

When the user further moves the finger and changes the moving direction within the button area of "T" at a predetermined angle or more, the mobile phone 1 detects the predetermined contact operation to receive an input of "T". At this time, when the moving speed of the finger at the time of detecting the predetermined contact operation is the threshold or more, the mobile phone 1 changes the strength of the vibration of the touch panel 2 to N−2K at a timing at which the finger enters a next button area after exiting the button area of "T". When the predetermined contact operation is detected, not limited to the example of FIG. 8, the strength of the vibration of the touch panel 2 is changed to N−K only when the finger enters a button different from a button displayed at the position where the predetermined contact operation is detected, and thereafter the strength of the vibration of the touch panel 2 may be returned to N.

In this way, when the moving speed of the finger at the time of detecting the predetermined contact operation is the threshold or more, the strength of the vibration of the touch panel 2 is changed at a timing at which the finger enters the next button, and the strength of the vibration of the touch panel 2 is kept constant until the finger exits to the outside of the button displayed at the position where the next predetermined contact operation is detected. Thereby even if notification fails to be executed within the area where the predetermined contact operation is detected, the notification can be executed before the user performs a next predetermined contact operation. Moreover, the control provided in this manner enables reduction of power consumption associated with the vibration. That is, by keeping the strength of the vibration of the touch panel 2 constant until the next predetermined contact operation is detected, it is not necessary to frequently change the strength of the vibration, which leads to reduction of power consumption.

In the example of FIG. 8, when the moving speed of the finger at the time of detecting the predetermined contact operation is the threshold or more a sign of K is inverted. In this way, by switching the direction of changing the strength of the vibration of the touch panel 2, the user can recognize that notification is performed at a timing different from the timing used when the moving speed of the finger is low. As illustrated in FIG. 7 and FIG. 8, the strength of the vibration of the touch panel 2 is changed K by K; however, K may be a positive value or a negative value. In other words, if the moving speed is less than the threshold, then the strength of the vibration of the touch panel 2 may be increased each time the predetermined contact operation is detected, while if the moving speed is the threshold or more, then the strength of the vibration of the touch panel 2 may be decreased each time the predetermined contact operation is detected. Conversely, if the moving speed is less than the threshold, then the strength of the vibration of the touch panel 2 may be decreased each time the predetermined contact operation is detected, while if the moving speed is the threshold or more, then the strength of the vibration of the touch panel 2 may be increased each time the predetermined contact operation is detected.

When the strength of the vibration of the touch panel 2 is changed to provide an operational feeling of the buttons to the user, by switching the timing and the direction of changing the strength of the vibration according to the moving speed of the finger in the above manner, a natural operational feeling can be provided to the user. For example, if the moving speed is lower than the threshold, by increasing the strength of the vibration within the button area where the predetermined contact operation is performed, a feeling of pressing the button can be provided. Moreover, if the moving speed is the threshold or more, by decreasing the strength of the vibration at a timing at which the finger enters a next button area, a feeling such that the previous button had been pressed can be provided.

The example of the case where the moving speed of the finger is lower than the threshold is illustrated in FIG. 7, and the example of the case where the moving speed of the finger is the threshold or more is illustrated in FIG. 8. However, when the moving speed of the finger changes during the input by the consecutive method, the timing and the direction of changing the strength of the vibration may be switched as needed.

Figure 13:
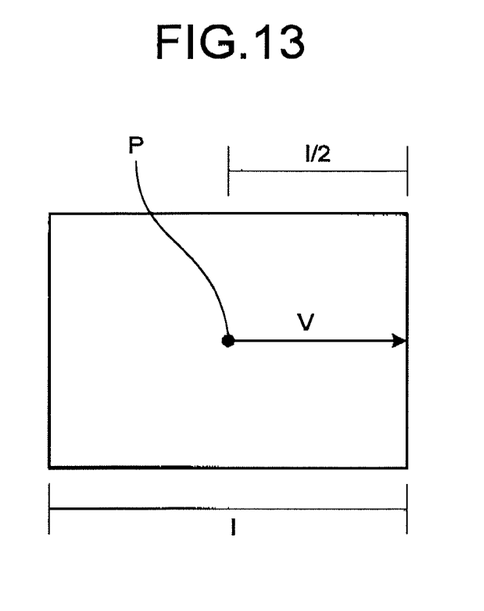
FIG. 13 is a diagram of an example of how to determine a threshold for a moving speed of the finger.

The threshold for the moving speed of the finger can be determined by, for example, the following Equation (1).

$$Vt = \frac{l}{2t} \quad (1)$$

Where Vt is a threshold for the moving speed of the finger, l is a length of a button area in the direction in which the finger is moving, and t is a time required from detection of a predetermined contact operation to change in the strength of the vibration of the touch panel 2. Equation (1) is based on an assumption that, as illustrated in FIG. 13, it is necessary for the finger to move a distance one-half of l during a time period from the time when a predetermined contact operation is detected at the center of a button area to the time when the finger exits the button area.

Figure 9:
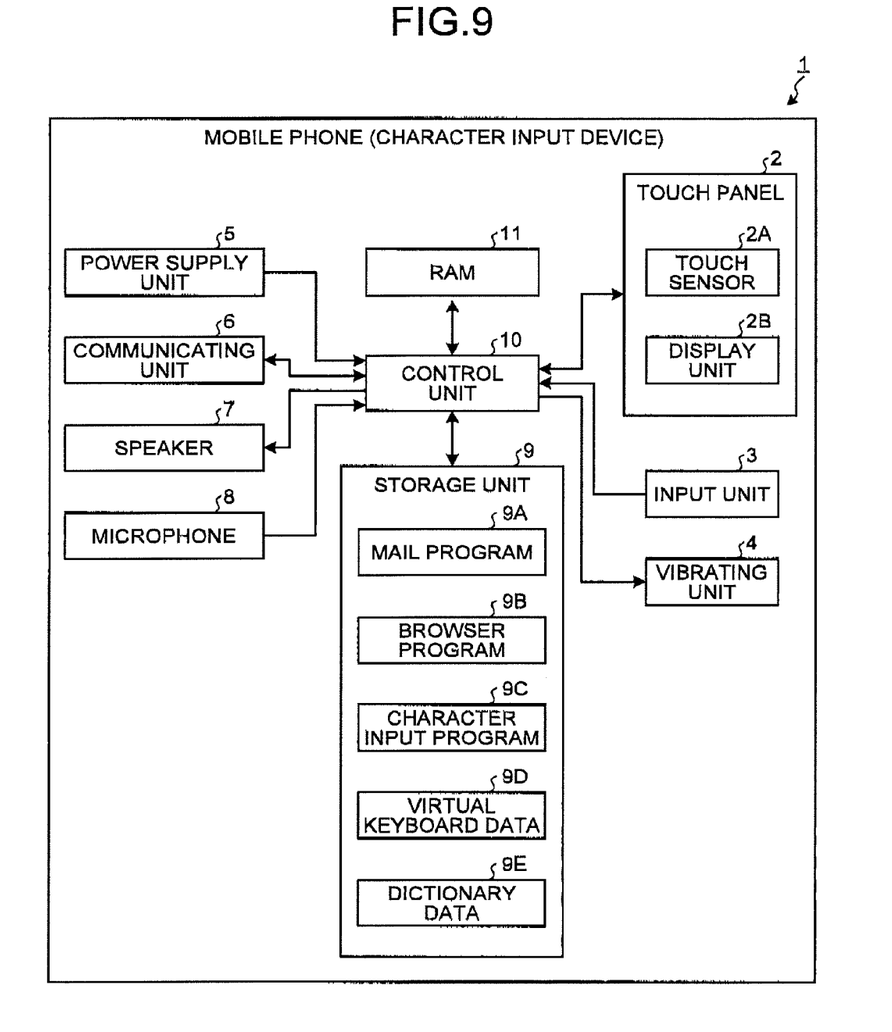
FIG. 9 is a block diagram of the mobile phone.

Next, a relation between the functions and the control unit of the mobile phone 1 will be explained below. FIG. 9 is a block diagram of the mobile phone 1 illustrated in FIG. 1. The mobile phone 1 includes the touch panel 2, the input unit 3, a vibrating unit 4, a power supply unit 5, a communicating unit 6, a speaker 7, a microphone 8, a storage unit 9, a control unit 10, and a random access memory (RAM) 11.

The touch panel 2 includes a display unit 2B and a touch sensor 2A placed over the display unit 2B. The touch sensor 2A detects various operations performed to the touch panel 2 using the finger as well as positions on the touch panel 2 where the operations are performed. The operation detected by the touch sensor 2A includes an operation of touching the surface of the touch panel 2 with the finger, an operation of moving the finger while keeping the finger in contact with the surface of the touch panel 2, and an operation of releasing the finger from the surface of the touch panel 2. The touch sensor 2A may adopt any one of detection methods such as a pressure sensitive type detection method and a capacitive type detection method. The display unit 2B is formed from, for example, a liquid crystal display (LCD) or an organic electroluminescence display (OELD), and displays text, graphics, images, and so on.

The input unit 3 receives a user's operation through a physical button or so and transmits a signal corresponding to the received operation to the control unit 10. The vibrating unit 4 vibrates the touch panel 2 at a strength according to a control signal input from the control unit 10. The power supply unit 5 supplies electric power obtained from a buttery or an external power supply to each of function units of the mobile phone 1 including the control unit 10. The communicating unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communicating unit 6. The speaker 7 outputs voice of the other party on the telephone communication, a ring tone, and the like. The microphone 8 converts the voice of the user or so to electrical signals.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. Specifically, the storage unit 9 stores therein a mail program 9A for transmitting, receiving and browsing mail, a browser program 9B for browsing Web pages, a character input program 9C for executing a character input process by the consecutive method and an edit process based on position specification through a specific operation, a virtual keyboard data 9D including definition for a virtual keyboard displayed on the touch panel 2 upon character input, and a dictionary data 9E with appropriate character strings registered therein. The storage unit 9 also stores therein an operating system program for performing basic functions of the mobile phone 1, and other programs and data such as address book data in which names, telephone numbers, mail addresses, and so on are registered.

The control unit 10 is, for example, a central processing unit (CPU), and integrally controls the operations of the mobile phone 1. Specifically, the control unit 10 executes a program stored in the storage unit 9 while referring to data stored in the storage unit 9 as necessary, and executes the various processes by controlling the touch panel 2, the communicating unit 6, and so on. The control unit 10 loads data, which is acquired, generated, or processed by executing the programs and the processes stored in the storage unit 9, to the RAM 11 providing a temporary storage area as necessary. The programs executed by the control unit 10 and the data to be referred to may be downloaded from a server through a wireless communication by the communicating unit 6.

Figure 10:
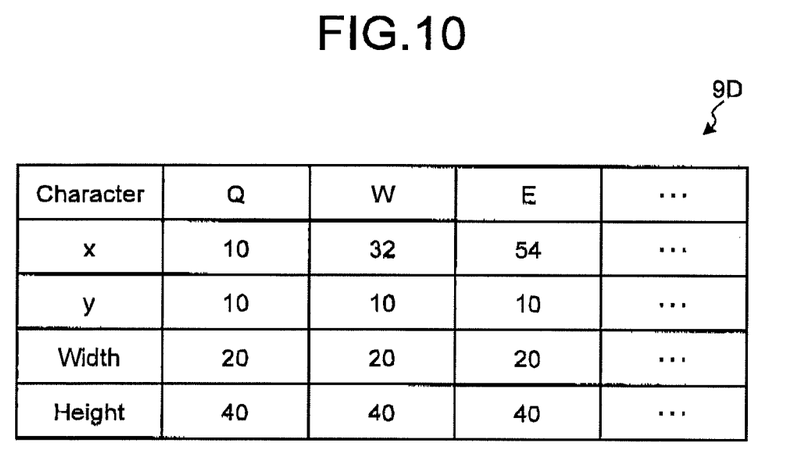
FIG. 10 is a diagram of an example of virtual keyboard data.

An example of the virtual keyboard data 9D stored in the storage unit 9 is illustrated in FIG. 10. As illustrated in the example of FIG. 10, for each button included in the virtual keyboard, a character corresponding to a button, a position of the button (e.g., upper left coordinates), a width, a height, and so on are registered in the virtual keyboard data 9D. In the example of FIG. 10, a character corresponding to a button is "Q", upper left coordinates of the button are X=10 and Y=10, a width and a height of the button are 20 and 40 respectively, and the like are registered.

Figure 11:
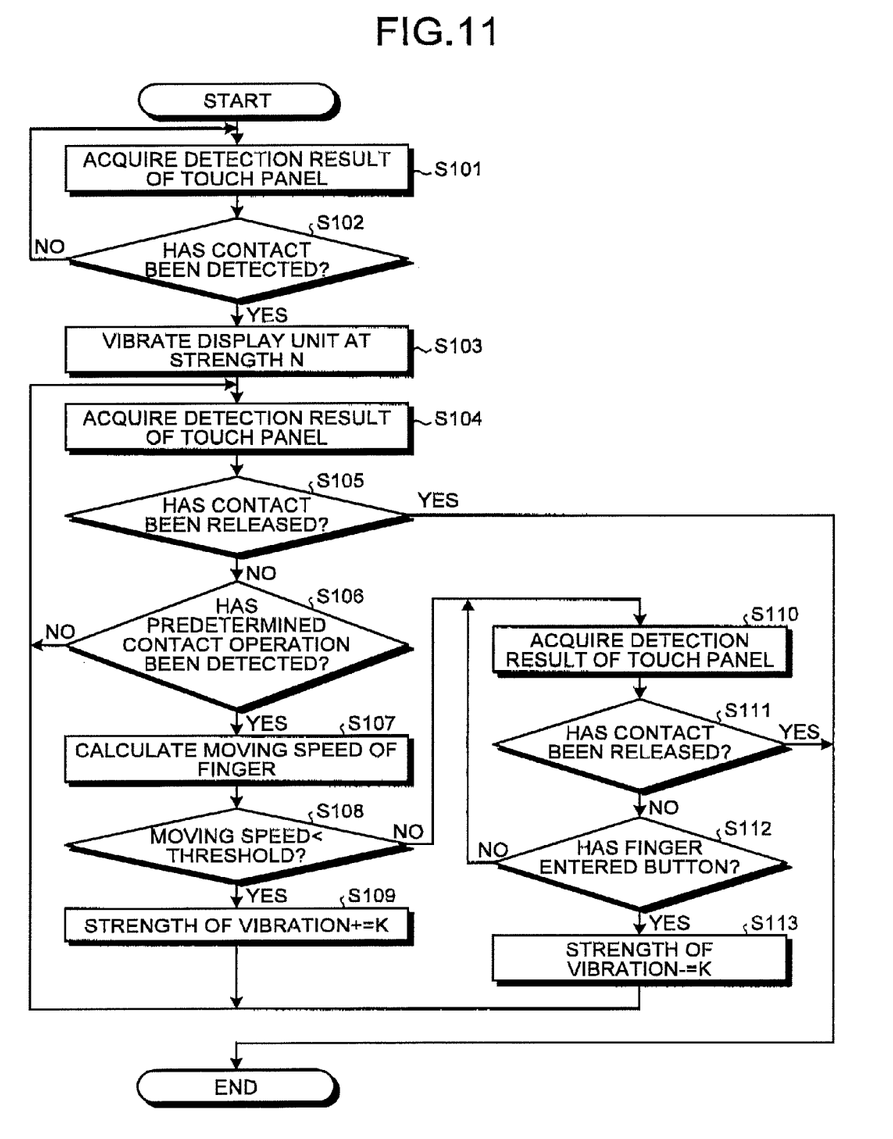
FIG. 11 is a flowchart of a procedure of a character input process performed by the mobile phone.

Next, a procedure of a character input process performed by the mobile phone 1 is explained. FIG. 11 is a flowchart of the procedure of the character input process performed by the mobile phone 1. The character input process illustrated in FIG. 11 is implemented by the control unit 10 that reads the character input program 9C from the storage unit 9 and executes it, and is repeatedly executed during display of the virtual keyboard 16 on the touch panel 2. The control unit 10 executes the character input program 9C or some other program, to thereby display the virtual keyboard 16 on the touch panel 2.

As illustrated in FIG. 11, first, the control unit 10 acquires a detection result of the touch panel 2, at Step S101. Then, the control unit 10 determines whether a contact by a finger has been detected, at Step S102. When the contact by the finger has not been detected (No at Step S102), the control unit 10 again executes Step S101 and the subsequent step.

When the contact by the finger has been detected (Yes at Step S102), the control unit 10 causes the vibrating unit 4 to vibrate the touch panel 2 (display unit 2B) at a strength N, at Step S103. The control unit 10 acquires the detection result of the touch panel 2 at Step S104, and determines whether the contact by the finger has been released at Step S105. When the contact by the finger has been released (Yes at Step S105), the control unit 10 ends the character input process.

When the contact by the finger has not been released, that is, when the contact by the finger is continued (No at Step S105), the control unit 10 determines whether a predetermined contact operation has been detected, at Step S106. When the predetermined contact operation has not been detected (No at Step S106), the control unit 10 again executes Step S104 and the subsequent steps.

When the predetermined contact operation has been detected (Yes at Step S106), the control unit 10 calculates a moving speed of the finger at the time of detecting the predetermined contact operation, at Step S107. When the moving speed is lower than the threshold (Yes at Step S108), the control unit 10 adds K to the strength of the vibration of the touch panel 2, at Step S109. After the strength of the vibration is changed in this manner, the control unit 10 again executes Step S104 and the subsequent steps.

When the moving speed is not lower than the threshold (No at Step S108), the control unit 10 acquires the detection result of the touch panel 2, at Step S110. The control unit 10 then determines whether the contact by the finger has been released based on the acquired detection result, at Step S111. When the contact by the finger has been released (Yes at Step S111), the control unit 10 ends the character input process.

When the contact by the finger has not been released (No at Step S111), the control unit 10 determines whether the finger has entered any one of button areas based on the acquired detection result, at Step S112. When the finger has not entered any one of button areas (No at Step S112), the control unit 10 again executes Step S110 and the subsequent steps. When the finger has entered any one of button areas (Yes at Step S112), the control unit 10 subtracts K from the strength of the vibration of the touch panel 2, at Step S113. After the strength of the vibration is changed in this manner, the control unit 10 again executes Step S104 and the subsequent steps.

As explained above, the mobile phone 1 changes the strength of the vibration of the touch panel 2 to provide a feedback to the user each time the predetermined contact operation is detected. Therefore, the user can recognize which character is input through the operation on the touch panel 2.

Figure 12:
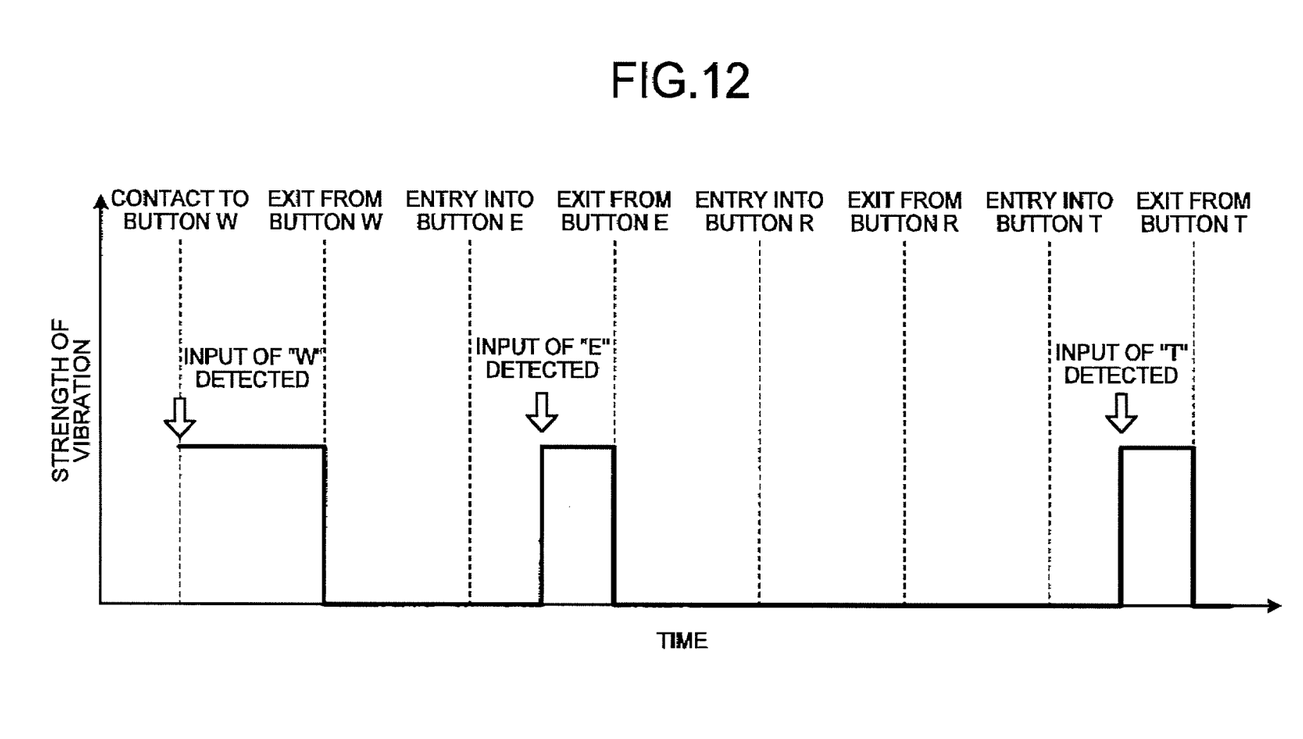
FIG. 12 is a diagram of another example of controlling vibration of the touch panel when characters are input in a consecutive method.

The aspects of the present invention represented in the embodiment can be arbitrarily modified without departing from the spirit of the present invention. For example, the way to change the strength of the vibration of the touch panel 2 as represented in the embodiment is an example, and therefore, the strength of the vibration may be changed in any way if the detection of the predetermined contact operation can be fed back to the user. For example, as illustrated in FIG. 12, when the predetermined contact operation is detected, the touch panel 2 is vibrated at a predetermined strength only within the button area where the predetermined contact operation is detected, and after the finger exits the button area, the vibration may be stopped. When the predetermined contact operation is detected, the vibration of the touch panel 2 may be stopped only within the button area displayed at the position where the predetermined contact operation is detected, and the vibration may be restarted after the finger exits the button area displayed at the position where the predetermined contact operation is detected.

In the embodiment, the feedback is performed when the predetermined contact operation for a character input is detected; however, as illustrated at Step S12 of FIG. 6, even when a predetermined contact operation for selecting a candidate for an input character string is detected, the feedback due to vibration of the touch panel 2 may also be performed.

When the predetermined contact operation is detected, the strength at which the touch panel 2 is vibrated is not only changed but also at least either one of color and brightness of the button area where the predetermined contact operation is detected may be changed. By adding a visual feedback in this manner, the user can more surely recognize which character is input.

When the moving speed of the finger at the time of detecting the predetermined contact operation is the threshold or more, instead of changing the strength of the vibration after it is detected that the finger enters another button area, it may be controlled so as to predict a timing at which the finger enters another button area based on the moving direction and the moving speed of the finger and to change the strength of the vibration at the predicted timing. In other words, the control unit 10 may instruct the vibrating unit 4 to change the strength of the vibration by the time, required from the time when the control unit 10 outputs a control signal to the time when the vibrating unit 4 changes the strength of the vibration, earlier than the timing at which the finger enters another button area. The control provided in this manner enables the feedback to be provided at a more natural timing for the user.

The advantages are that one embodiment of the invention provides a character input device, a character-input control method, and a character input program that allows the user to recognize which character is input through an operation on the touch panel.

What is claimed is:

1. A character input device comprising:
a touch panel for displaying a plurality of buttons each of which corresponds to a character, and for detecting a contact operation;
a vibrating unit for vibrating the touch panel; and a control unit for receiving, when a contact at a first position on the touch panel on which the plurality of buttons are displayed is started, a character corresponding to a first button of the plurality of buttons displayed at the first position, as an input, to cause the vibration unit to vibrate the touch panel at a first vibration behavior when the contact at the first position on the touch panel is started and for receiving, when a predetermined contact operation on the touch panel is detected by the touch panel while the contact on the touch panel is continued after the start of the contact at the first position on the touch panel,
a character corresponding to a second button of the plurality of button, displayed at a position where the predetermined contact operation is detected, as an input, to cause the vibrating unit to vibrate the touch panel at a second vibration behavior which is different from the first vibration behavior when the predetermined contact operation is detected, wherein the second vibration behavior is determined without depending on the position where the predetermined contact operation is detected; and
wherein the control unit is configured to cause, when a moving speed of the contact detected by the touch panel is lower than a threshold, the vibrating unit to change a strength of vibration of the touch panel at a first timing during a time period from detection of the contact operation to exit of the contact to outside of the button displayed at the position where the contact operation is detected, and
to cause, when the moving speed of the contact detected by the touch panel is not lower than the threshold, the vibrating unit to change a strength of vibration of the touch panel at a second timing at which the contact enters, after exiting to outside of the button displayed at the position where the contact operation is detected another button of the plurality of buttons.

2. The character input device according to claim 1, wherein the control unit is configured to cause the vibrating unit to continuously vibrate the touch panel from the start of the contact at the first position to an end of the contact at a second position on the touch panel.

3. The character input device according to claim 1, wherein the control unit is configured to cause the vibrating unit to vibrate the touch panel only in a time period from detection of the contact operation to exit of the contact to outside of the button displayed at the position where the contact operation is detected, during a time period from the start of the contact at the first position to the end of the contact at the second position.

4. The character input device according to claim 1, wherein the control unit is configured to cause the vibrating unit to change a strength of vibration of the touch panel during a time period from detection of the contact operation to exit of the contact to outside of the button displayed at the position where the contact operation is detected.

5. The character input device according to claim 1, wherein the control unit is configured to cause the vibrating unit to change a strength of vibration of the touch panel when the contact enters, after exiting to outside of the button displayed at the position where the contact operation is detected, another button.

6. The character input device according to claim 1, wherein the control unit is configured to cause the vibrating unit to change the strength of the vibration of the touch panel in either a direction of increasing the strength of the vibration or a direction of decreasing the strength of the vibration at the first timing, and change, at the second timing, the strength of the vibration of the touch panel in a direction different from that at the first timing.

7. The character input device according to claim 1, wherein the control unit is configured to change at least one of color and brightness of the button displayed at the position where the contact operation is detected.

8. A character-input control method executed by a character input device that includes a touch panel and a vibrating unit for vibrating the touch panel, the character-input control method comprising:
   displaying a plurality of buttons each of which corresponds to a character on the touch panel;
   detecting a start of a contact at a first position on the touch panel on which the plurality of buttons are displayed;
   receiving a character corresponding to a first button of the plurality of buttons displayed at the first position, as an input;
   causing the vibrating unit to vibrate the touch panel at a first vibration behavior when the contact at the first position on the touch panel is started;
   receiving a character corresponding to a second button of the plurality of buttons, displayed at a position where a predetermined contact operation is detected, as an input, when a predetermined contact operation on the touch panel is detected by the touch panel while the contact on the touch panel is continued after the start of the contact at the first position on the touch panel; and
   causing the vibrating unit to vibrate the touch panel at a second vibration behavior which is different from the first vibration behavior when the predetermined contact operation is detected, wherein the second vibration behavior is determined without depending on the position where the predetermined contact operation is detected; and
   wherein the control unit is configured to cause, when a moving speed of the contact detected by the touch panel is lower than a threshold, the vibrating unit to change a strength of vibration of the touch panel at a first timing during a time period from detection of the contact operation to exit of the contact to outside of the button displayed at the position where the contact operation is detected, and
   to cause, when the moving speed of the contact detected by the touch panel is not lower than the threshold, the vibrating unit to change a strength of vibration of the touch panel at a second timing at which the contact enters, after exiting to outside of the button displayed at the position where the contact operation is detected another button of the plurality of buttons.

9. A non-transitory storage medium that stores a character input program for causing, when executed by a character input device that includes a touch panel and a vibrating unit for vibrating the touch panel, the character input device to execute:
   displaying a plurality of buttons each of which corresponds to a character on the touch panel;
   detecting a start of a contact at a first position on the touch panel on which the plurality of buttons are displayed;
   receiving a character corresponding to a first button of the plurality of buttons displayed at the first position, as an input;
   causing the vibrating unit to vibrate the touch panel at a first vibration behavior when the contact at the first position on the touch panel is started;
   receiving a character corresponding to a second button of the plurality of buttons, displayed at a position where a predetermined contact operation is detected, as an input, when a predetermined contact operation on the touch panel is detected by the touch panel while the contact on the touch panel is continued after the start of the contact at the first position on the touch panel; and
   causing the vibrating unit to vibrate the touch panel at a second vibration behavior which is different from the first vibration behavior when the predetermined contact operation is detected, wherein the second vibration behavior is determined without depending on the position where the predetermined contact operation is detected; and
   wherein the control unit is configured to cause, when a moving speed of the contact detected by the touch panel is lower than a threshold, the vibrating unit to change a strength of vibration of the touch panel at a first timing during a time period from detection of the contact operation to exit of the contact to outside of the button displayed at the position where the contact operation is detected, and
   to cause, when the moving speed of the contact detected by the touch panel is not lower than the threshold, the vibrating unit to change a strength of vibration of the touch panel at a second timing at which the contact enters, after exiting to outside of the button displayed at the position where the contact operation is detected, another button of the plurality of buttons.

* * * * *